United States Patent [19]

Brownstein et al.

[11] Patent Number: 5,671,202
[45] Date of Patent: *Sep. 23, 1997

[54] APPARATUS AND METHOD FOR DATA SECURITY IN AN OPTICAL DISK STORAGE SYSTEM

[75] Inventors: Scott Alan Brownstein; Joseph Paul Lentz; Thomas Richard Cushman; Patrick Joseph Kline, all of Rochester, N.Y.

[73] Assignee: Eastman Kodak Company, Rochester, N.Y.

[*] Notice: The term of this patent shall not extend beyond the expiration date of Pat. No. 5,489,768.

[21] Appl. No.: 432,039

[22] Filed: May 1, 1995

Related U.S. Application Data

[60] Division of Ser. No. 999,626, Dec. 31, 1992, Pat. No. 5,489,768, which is a continuation-in-part of Ser. No. 810,976, Dec. 20, 1991, Pat. No. 5,430,281.

[51] Int. Cl.⁶ .............................. G11B 5/09; G06K 7/10
[52] U.S. Cl. .............................. 369/58; 235/464; 235/494
[58] Field of Search ................................. 369/32, 47, 48, 369/54, 58, 275.3; 235/488, 494, 462, 464, 454

[56] References Cited

U.S. PATENT DOCUMENTS 3,752,961  8/1973  Torrey ........................ 235/464
4,677,604  6/1987  Selby, III et al. .............. 369/47 X
4,891,504  1/1990  Gupta ........................... 369/47 X
5,150,339  9/1992  Veda et al. ..................... 369/32
5,489,768  2/1996  Brownstein et al. ............. 235/454

*Primary Examiner*—P. W. Huber
*Attorney, Agent, or Firm*—Raymond L. Owens

[57] ABSTRACT

An optical storage disk for use in an optical storage system includes a storage layer which is capable of being disrupted when a laser bee of sufficient intensity is focused thereon. The optical storage disk has a transparent substrate layer on one side of the storage layer and a lacquer layer on the other side of the storage layer. The disruptions provided by the laser beam are selected to provide human readable and/or machine readable patterns. The optical disk can be of the type with data written thereon during fabrication, or the disk can be of the type in which data can be impressed thereon after fabrication of the optical disk. The patterns on the optical disk can be in the form of optical bar codes. In one application of the present invention involving the type of disk on which data can be written after fabrication, the pattern resulting from application of the laser beam to the disk is read by an optical reading device and transferred to the disk in the data format. The resulting embedded characters are used, in conjunction with files stored on the medium, to provide security against unpermitted access to the files. In addition for writable optical storage medium, the embedded characters can be used to prevent inappropriate material from being stored on the optical storage medium.

4 Claims, 9 Drawing Sheets

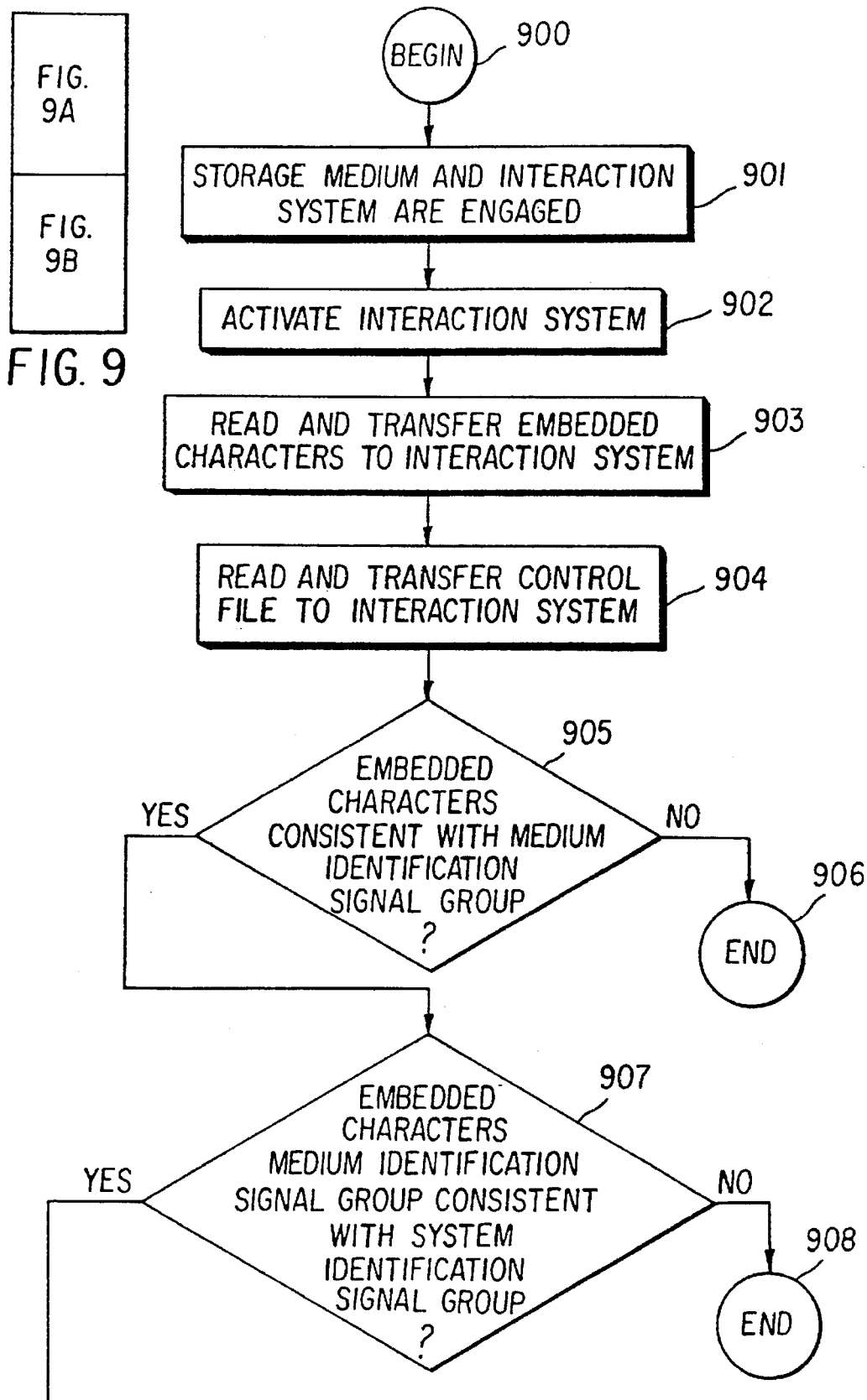

APPARATUS AND METHOD FOR DATA SECURITY IN AN OPTICAL DISK STORAGE SYSTEM

The is a Divisional of application Ser. No. 07/999,626, filed Dec. 31, 1992, now U.S. Pat. No. 5,489,768, which is a continuation-in-part of application Ser. No. 07/810,976 filed on Dec. 20, 1991, now U.S. Pat. No. 5,430,281.

BACKGROUND OF THE INVENTION

1. Field of Invention

This invention relates generally to optical information storage and retrieval systems and, more particularly, to techniques for providing security for the data stored in the optical information storage and retrieval system. The increased system security is provided by the inclusion in the medium of a visible and indelible identifying code and the storage of related data files on the storage medium. The visible identifying code is used in conjunction with the related files by the apparatus accessing the data files to protect the data files stored on the media against unauthorized access to the data files and/or unauthorized copying of the data files.

2. Description of the Related Art

Optical storage medium, and particularly, the optical disk is currently finding increasing use in the high density storage of large quantities of data. In the optical medium, the information is retrieved through the interaction of a radiation beam with the information storage medium. At present, three principal types of optical storage media are in common use. The first type of optical storage medium is manufactured with the information stored thereon, generally in the form depressions formed into a polycarbonate substrate. A reflecting coating is deposited on the polycarbonate substrate and the radiation bee is focused on the reflecting layer. This type of optical disk is frequently referred to, in the disk embodiment, as a CD audio disk or a ROM (i.e., read only memory) disk. The second type of optical storage medium has the capability of having information recorded (written) thereon at some time after the fabrication of the medium. Such an optical storage medium in the disk embodiment is frequently referred to as a writable optical storage disk. The third type of optical storage medium has the capacity to have information recorded on the medium after fabrication. In addition, at a later time, the stored information can be erased or modified. This type of optical storage medium in the disk embodiment is generally referred to as an erasable or a re-writable optical storage disk. In each type of optical storage (disk) medium, the storage layer is supported and protected by a polycarbonate support substrate and by a protective (lacquer) overcoat layer. However, the storage layer is modified in the writable disk and in the erasable disk. The storage layer in the writable disk includes a reflector layer (generally fabricated from gold) proximate the lacquer overcoat layer and includes a recording layer, typically a dye polymer layer, proximate the polycarbonate layer. The newly fabricated writable optical storage disk has a recording layer that is responsive to radiation having selected parameters, the radiation changing the optical properties of the recording layer. Differences in the optical properties of the recording layer can be detected, through the interaction with an impinging radiation beam and data, encoded by means of the optical property changes, can be recovered. In order to simplify the discussion, the recording, storage, and/or the reflective layer of the writable optical disk will be referred to as the storage layer. In the optical information storage and retrieval system, a read/write head is moved in a specified path relative to the optical storage medium. The read/write head provides a radiation beam which, after interacting with a region of the optical storage medium, is detected. The information stored on the optical storage medium takes the form of data-bearing regions with differing optical properties depending, for example on the logical state being represented by the particular region. The radiation beam which has interacted with the optical storage medium has detectable differences resulting from the interaction with the data-bearing regions. These detectable differences are converted into electrical signals. The electrical signals are subsequently converted to a format which can be conveniently manipulated by a signal processing system.

In order to provide security for the data stored on optical storage medium, a need has been felt for a technique for providing permanent and difficult-to-compromise identification marking for the optical storage medium. Using this identification marking, the data stored on the medium could be determined by and/or related to the marking. In addition, any problems that might originate with the manufacturing process can be related to disks fabricated during the same period of time or even to the same batch. The history of the usage of the disk can be determined when a record is kept of the identifying information at the time of the accessing of the disk.

In the prior art, identification markings have been applied to the surface of the disk by means of mechanical disruption of the surface or by deposition of legible material on the surface. This information, however, being on the surface of the disk can be compromised either accidentally or intentionally.

Recently, in U.S. Pat. No. 4,961,077 issued in the name of D. L. Wilson et al., a technique for the permanent labelling of the disks was described. Specifically, the metal reflective layer, upon which the permanent identification information is stored as areas of varying reflectivity, is marked by means of a pulsed laser. The pulsed laser causes an indelible marking on the reflective layer, a marking which is protected by the same transparent coating which protects the reflective coating. The process described in the Wilson reference is extremely sensitive to the energy level of the laser beam, too small an energy level in the laser beam not providing an identifiable marking, while too much energy can disrupt the lacquer overcoat layer and/or the polycarbonate layer used to protect the reflective layer. The disruption of the storage layer can result in damage to the surrounding portions of the optical disk. In addition, applying the laser beam to the reflective surface through the narrower of the two protective coatings is recommended to minimize the destructive effects of the laser beam resulting from the passage of high intensity radiation through the layers.

Therefore, in order to provide a mechanism for providing security for data already written on a storage medium or for data to be written of the storage medium, a need has been felt for a technique for providing indelible identifying markings for the optical storage media which is relatively insensitive to the power of the radiation beam and which reduces the damage to the optical disk. Also needed is a technique for enhancing the machine readability of the disk markings. Furthermore, a need has been felt for apparatus and a method to incorporate the indelible markings in a system in which the disk can be used to insure the unauthorized access to the information stored on the disk.

SUMMARY OF THE INVENTION

The present invention is directed to overcoming one or more of the problems set forth above. Briefly summarized, according to one aspect of the present invention, the identification marking is applied to the storage layer of the optical disk prior to the curing of the protective lacquer overcoat or prior to the application of the protective overcoat itself. Because the lacquer overcoat, prior to curing of this material, is relatively elastic, the disruption of the overcoat as a result of the laser interaction with the reflective layer can be accomplished without excessive damage. The markings provided by the laser beam are arranged in preselected patterns, the patterns including machine readable and human readable information. In the alternative, the marking by the laser beam can be applied before the overcoat is actually applied. According to one embodiment, optical bar code patterns can be printed in a manner that the position of an optical bar code reader relative to the center of the disk is irrelevant in interpreting the optical bar code message. With the indelible markings are placed on the storage medium, the data files stored on the on the optical storage disk can include encoded signal groups which, when decoded, can be automatically compared with the visible markings. The stored signal groups, when consistent with the visible medium markings, can be additionally used to provide a decoding key for the data files stored on the disk. The system accessing the storage medium can be provided with a system identification code which can be (automatically) compared to the medium identification to insure that an unauthorized system is not attempting to interact with the storage medium. The identification and markings prevent inappropriate files from being stored on the medium.

The identification markings and the files of the present invention can be advantageously used to prevent unauthorized access the files on the optical medium. The system attempting to access the data files must first determine that the identification markings are consistent with encoded signal groups stored on the disk. When the identification markings and the encoded signal groups are consistent, then access to the data files on the storage medium is permitted. However, the data files may contain a decoding key which must be used by the accessing system to read the stored data files. For data files to be stored on the optical storage medium, preselected data signal groups can be required to permit the storage. The preselected data signal groups are compared with the identification markings and/or the medium identification signal groups to insure that only appropriate data files are stored on the storage medium.

These and other aspects, objects, features and advantages of the present invention will be more clearly understood and appreciated from a review of the following detailed description of the preferred embodiments and appended claims, and be reference to the accompanying drawings.

BRIEF DESCRIPTION OF THE DRAWINGS

FIG. 3 illustrates a first embodiment of a process by which machine readable and human readable information can be indelibly fixed in the optical storage media.

FIG. 4A is a cross sectional view of a mark in an optical storage disk generated as a result of the process illustrated in FIG. 3A, while

FIGS. 9, 9A and 9B depict a flow diagram illustrating the interaction of the storage medium interaction system according to the present invention.

DESCRIPTION OF THE PREFERRED EMBODIMENTS

1. Detailed Description of the Figures

Figure 1:
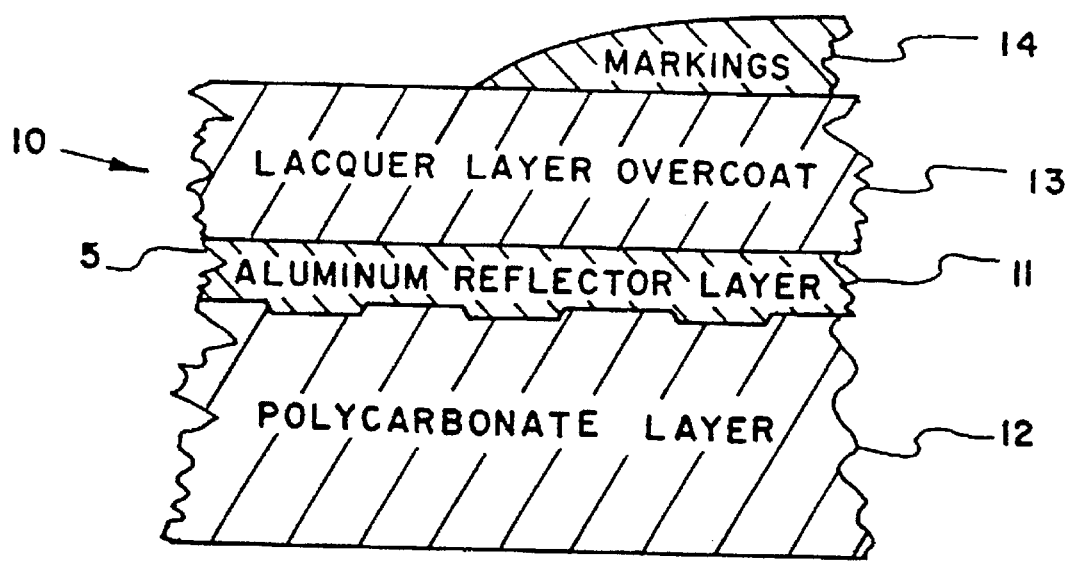
FIG. 1 is a cross sectional view of an optical storage disk of the type generally referred to as a read-only optical storage disk.

Referring to FIG. 1, a cross-sectional view of a read-only optical storage disk 10 for storing prerecorded data (in a form which can be identified by a radiation beam interacting with the disk) is shown. Transparent polycarbonate or substrate layer 12, or similar material has an optical transmission characteristic which permits the radiation interacting with the storage layer structure of the optical disk to be transmitted therethrough. The polycarbonate layer also acts as a support and protection layer for the remainder of the optical disk. Next to the polycarbonate layer 12 is the aluminum reflector layer 11. The polycarbonate layer 12 is fabricated with the stored information as a surface structure. The reflecting layer is deposited in such a manner as to provide a surface generally retaining the structure of the polycarbonate surface. A lacquer or other protective overcoat layer 13 is applied to the aluminum reflector layer in an uncured state. The lacquer or protective layer is typically of the type which is cured by ultraviolet radiation and the cured lacquer layer 13 supports and protects the aluminum reflector layer 11. In the past, identification markings 14 have been typically printed on the surface of the lacquer overcoat layer 13 or mechanically scribed in the surface of lacquer overcoat layer 13.

Figure 2:
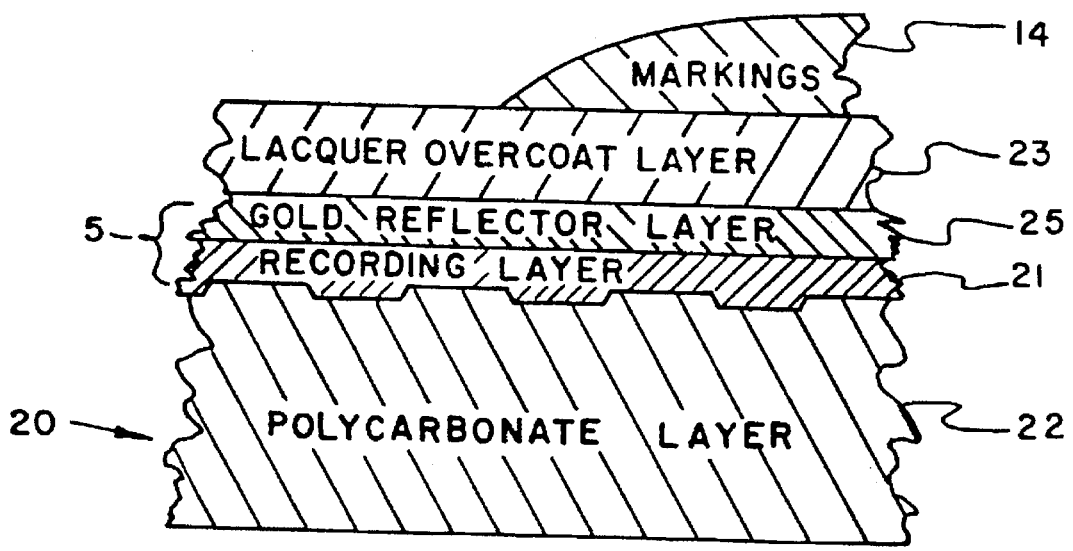
FIG. 2 is a cross sectional view of an optical disk of the type generally referred to as a writable optical storage disk.

Referring to FIG. 2, a writable optical storage disk 20 used for the storage of information is shown. In this type of optical storage disk, the data can be 'written' on the disk after the disk is fabricated. As with the optical storage disk of FIG. 1, the writable optical disk includes a polycarbonate substrate of support layer 22. The storage layer 5 of the disk consists of a recording layer 21, which can be a dye polymer layer, and reflector layer 25, which can be fabricated from gold. Next to the reflector layer 25 is a lacquer overcoat layer 23, which is applied and then cured. Finally, the markings 24 on the surface of the disk provide human and machine readable information.

Figures 3A, 3B:
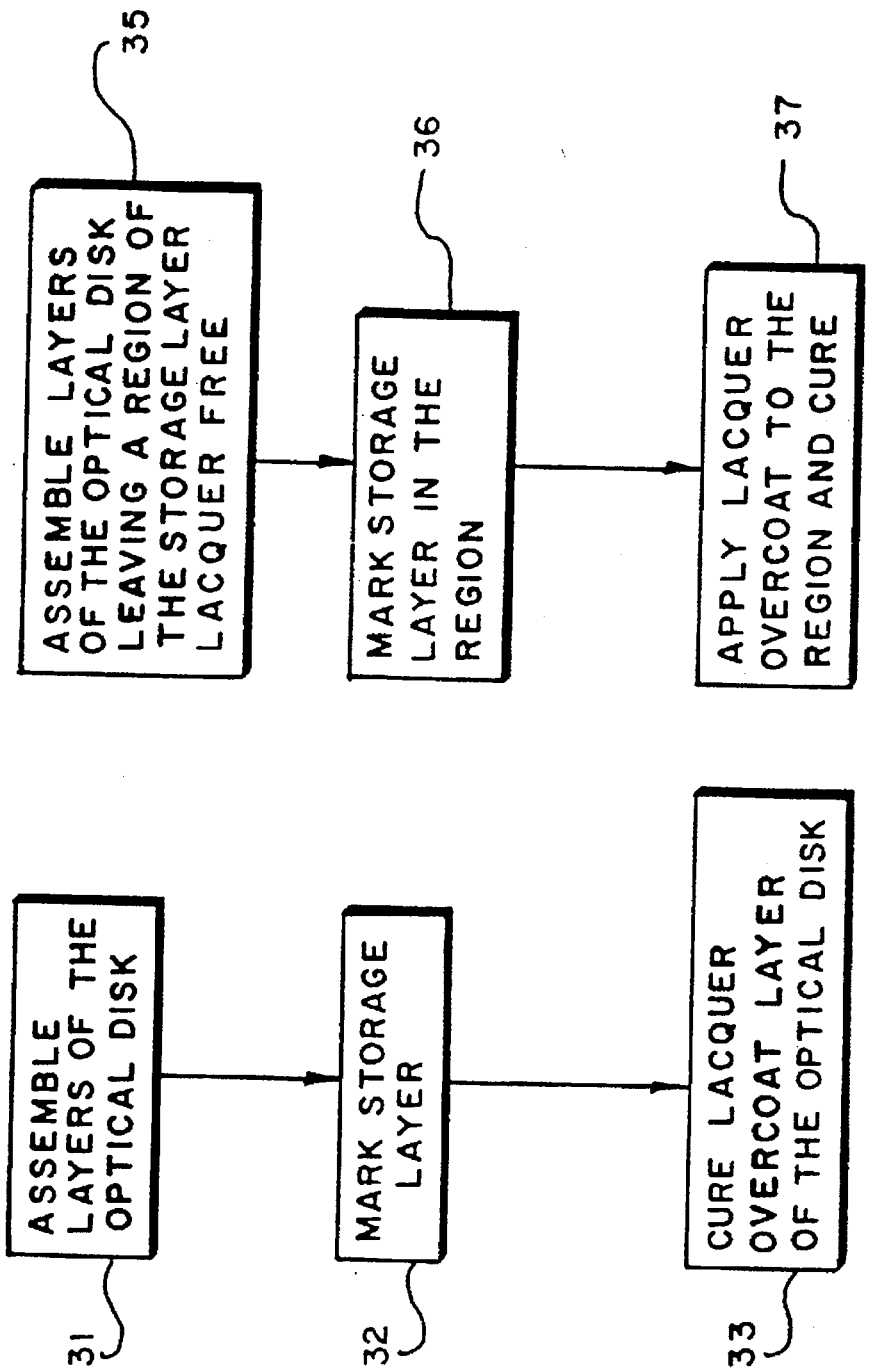
FIG. 3B illustrates a second embodiment of a process by which machine readable and human readable information can be indelibly fixed in an optical storage media.

Referring to FIG. 3A, the process for providing indelible information on a disk is shown. In step 1, the several layers of the optical disk is assembled. In step 32, the storage layer and the reflecting layer of the optical disk has information applied thereto, typically by using laser radiation to disrupt an interior surface region. In step 33, the lacquer overcoat layer is cured, providing the final step in the fabrication of an optical disk according to the present invention. In FIG. 3B, an alternative process for providing indelible information on an optical disk is shown. In step 35, several layers of the optical disk are assembled. However, the surface region of the storage layer and reflective layer, on which the writing is to be inscribed, does not have the lacquer or protective coating applied thereon. In step 36, the marking of the surface is accomplished. In the preferred embodiment, this marking is accomplished by focused high intensity radiation, such as focused laser radiation. In step 37, the newly applied protective overcoat is applied to the region which has been marked and, if required, the protective coating is cured.

Figure 4A:
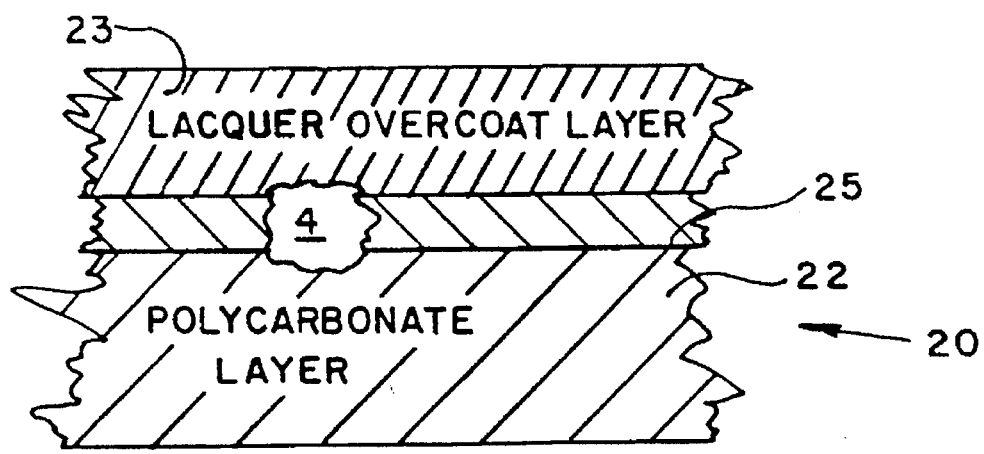
Figure 4B:
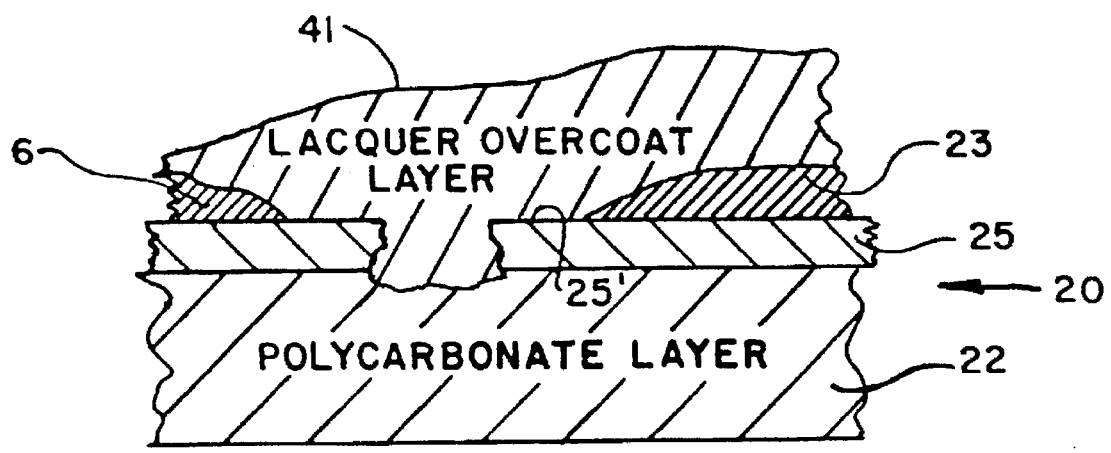
FIG. 4B is a cross sectional view of a mark in an optical storage disk generated as a result of the process illustrated in FIG. 3B.

Referring to FIG. 4A, a phenomenological representation of an identifying mark on an optical disk, capable of having information written thereon after fabrication, is shown. The disk 20 is fabricated with a polycarbonate layer 22, a reflecting layer 25, and a lacquer overcoat layer 23. The disruption 4 caused by the laser radiation is in the reflector layer 25, depending on the intensity of the radiation can extend to or into the polycarbonate layer. In FIG. 4B, the disk 20 is assembled with the polycarbonate layer 22, the reflecting layer 25, and the lacquer or protective overcoat layer 23. However, a region 25' is not covered by the lacquer overcoat. The radiation causes a disruption in a selected region of the reflecting layer 5. The radiation parameters can be adjusted to provide relatively little impact on the polycarbonate substrate. The region without the lacquer overcoat can also have printing applied thereto. The additional lacquer overcoat is applied, protecting the disrupted and/or printed region and protecting the information represented thereby from compromise.

Figure 5:
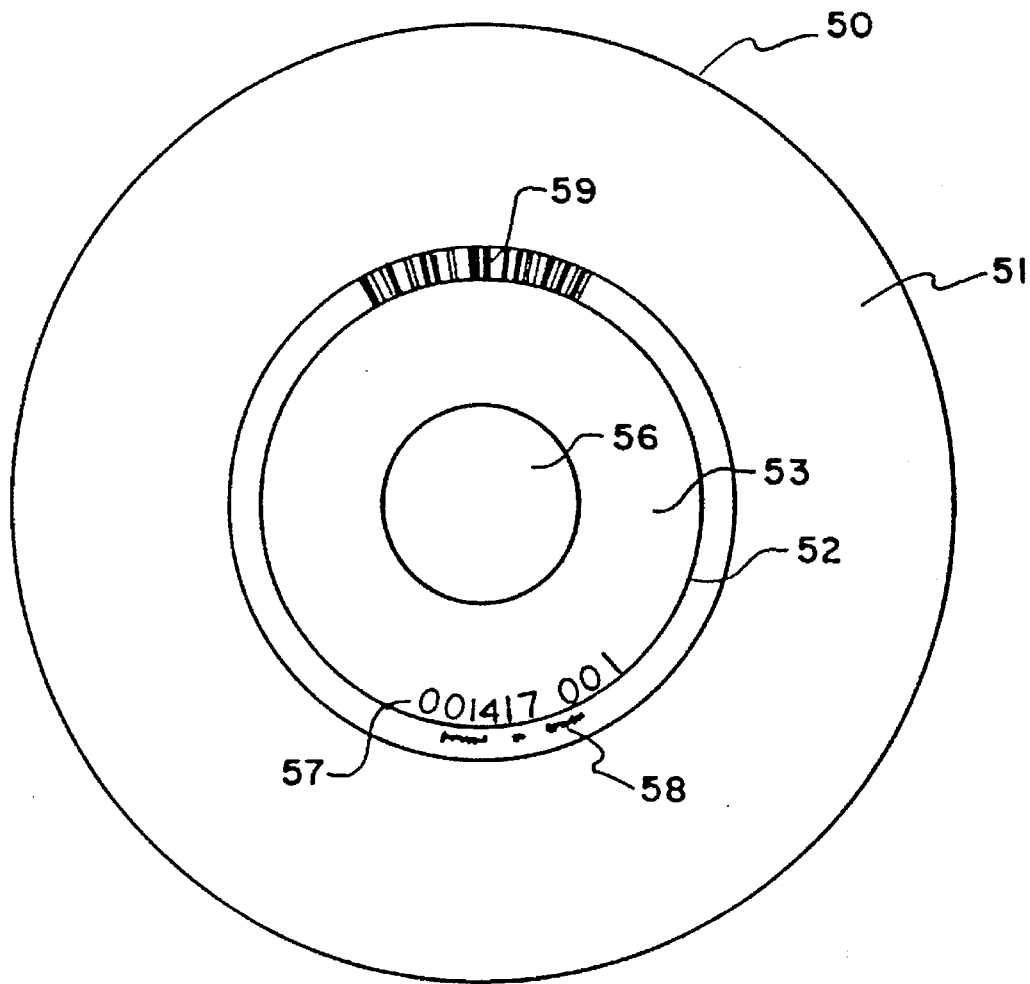
FIG. 5 illustrates an optical disk having machine readable and human readable text printed thereon.

Referring to FIG. 5, a top view of a optical storage disk, particularly a type of disk 50 known as a compact disk (CD) is shown. The optical disk 50 typically has four regions which, with increasing radius can be defined as the following. Aperture 56 provides a structure to engage a spindle for controlled rotation of the disk. The next area is a clamp area 53. The clamp area 53 typically does not have a storage layer associated therewith and is used to provide a space wherein the spindle can be mechanically coupled to the disk without interfering with access to the data stored on the disk. The mirror area 52 has a storage layer associated therewith but does not have data embedded therein and, therefore, has a mirror-like appearance. Data area 51 of disk 50 has data stored on the storage layer including the reflecting layer associated therewith and, consequently, because of the structure in the reflecting layer, has a dull appearance when compared to the mirror-like appearance of mirror area 52. The mirror area 52 can be labelled in either a machine readable code 55 and/or with human readable markings by the process described in FIG. 3A and FIG. 3B, and illustrated by FIG. 4A and FIG. 4B. The disk 50 can therefore be labelled or marked by carbonizing the plastic in clamp area 53, marking the mirror area 52 of an optical disk 50 in the presence of an uncured lacquer overcoat layer 23 and then curing the lacquer overcoat layer as described above, marking the mirror area 52 of the disk prior to application of the protective overcoat 41 and curing of the lacquer overcoat region 41 after application of the protective coating, or marking the mirror region 52 after the protective layer 23 is cured. In the preferred embodiment, a group of alpha/numeric characters 58 are printed in the clamp area and identifying fabrication information. Alpha/numeric characters are provided in a human readable format and are printed on the surface of the mirror region 52. Code characters 59 are provided in the mirror region 52 in a machine readable (i.e., bar code) format.

Figure 6:
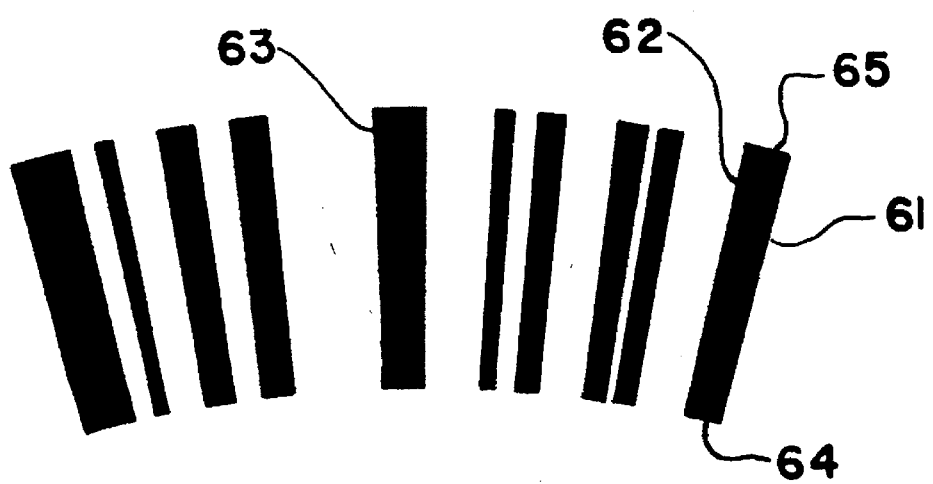
FIG. 6 illustrates how the optical bar code characters are formed according to the present invention.

Referring to FIG. 6, an expanded view of the technique for writing information capable of being interpreted by an optical bar code reader in a manner in which the distance of the reader from the center of the disk is not important, even though the linear velocity of the optical code past the reader is a function of radius. The optical bar code markings 61 are formed by marking the area between two radius lines 61 and 62 from a first radial distance ($R_1$) 64 to a second radial distance ($R_2$) 65. With this bar code configuration, for a constant angular velocity of the disk, the distance of a bar code reader from the center of the disk is irrelevant. The time each bar interacts optically with the detector of the optical bar code reader retrieving information from the storage is independent of the distance from the disk center.

Figure 7:
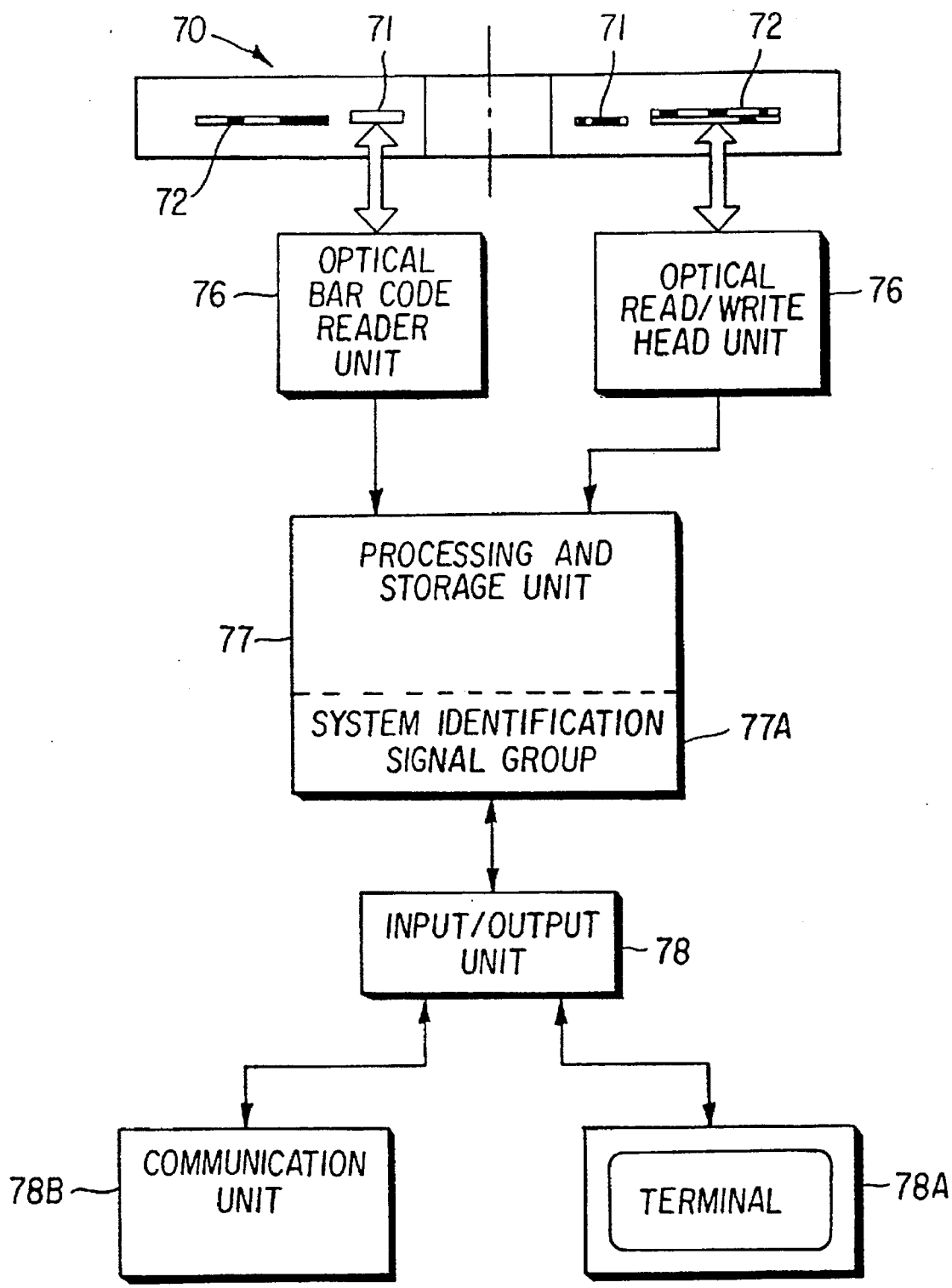
FIG. 7 is a block diagram of the storage medium and the read/write head including apparatus associated therewith of the storage and retrieval unit.

Referring now to FIG. 7, a block diagram of the apparatus for implementing the security mechanisms of the present invention is shown. The optical read/write head unit 75 interacts with an information storage medium 70 which, in the preferred embodiment, is a writable optical information storage disk, to retrieve information from and to store information on, the storage disk (medium) 70. The optical storage disk 70 includes a recording layer 72 extending over an outer portion of the disk. The inner portion of the disk 70 includes embedded characters (identification markings) 71. In the preferred embodiment, these embedded characters are in a machine-readable format such as an optical bar code format. The recording layer 72 can extend over a part or all of the inner portion of the storage disk 70, but no information is typically stored thereon. When the recording layer 72 does not extend over the inner disk portion, then the inner disk portion is typically transparent. Otherwise, when the recording layer 72 extends onto the inner portion of the disk 70, the inner portion of the disk will then be opaque to the light incident thereon. The interaction system includes an optical read/write head unit 75 for interacting with the recording layer of the optical disk and an optical character recognition unit 76 for interacting with the embedded characters 71. The embedded characters 71 are typically positioned on the inner portion of the optical disk 70. The optical read/write head unit 75 and the optical character recognition unit 76 are coupled to a processing and storage unit 77. The processing and storage unit 77 is coupled to an input/output unit 78. The input/output unit 78 includes apparatus and/or components which permit an operator to control the interaction with optical disk 70 and to provide for the entry of data into and for the transfer of data from the processing and storage unit 77. Input components can include a terminal 78A for entering data and control signals into the system and for displaying data and operational parameters. Input components can also include a communication unit 78B which can exchange control and/or data signal groups between the processing and control unit 77 and a remote location. The processing and storage unit 77 includes components responsive to signals from the optical character recognition unit 76 and signals from the optical read/write head unit 75 for reformatting data signal groups into a format which can be processed by and can be stored in processing and storage unit 77. The processing and storage unit 77 also provides control signals to the optical character recognition unit 76 and to the optical read/write head unit 75 for the optical illumination and optical sensor components which result in the identification and transfer of selected data signal groups on the storage medium 70. In addition, the processing and storage unit 77 provides an interface between the input/output unit 78 and associated subunits and the optical character recognition unit 76 and the optical read/write head unit 75. For example, based on the signals from the optical read/write head unit 73, the processing and storage unit 77 can apply control signals to motor which is part of the optical read/write head 75. The control signals are used to position the optical components of the read/write head unit 75 relative to the storage medium 70, i.e., thereby providing tracking and focussing control. The processing and storage unit 77 can also provide control signals to a motor or motors (not shown) associated with apparatus (also not shown) which control the motion of the disk, these control signals determining the engagement and rotation of the spindle to the optical storage disk medium 70. Once the appropriate relative movement is established between the optical storage disk 70 and the components interacting therewith, then the interacting components, i.e., the read/write head unit 75 and the optical character recognition system 76 can be electrically activated to transfer information to and from the optical disk 70. Similarly, an operator can manipulate the signal input components to specify that the interaction should take place between the optical read/write head unit 75 and a preselected portion (i.e., identified files) of the storage medium 70. The processing and storage unit 77 receives the signals entered into the input/output unit 78 and provides the proper control signals to position the read/write head unit 75 in an appropriate position relative to the optical disk 70, activates radiation source and sensor components of the read/write head unit 73, and controls the transfer of the identified data files between the read/write head unit 75 and optical disk 70. In addition, the processing and storage unit 77 can include an interaction system identification signal group 77A. The use of the interaction system identification signal group 77A is discussed below in conjunction with identification signal groups associated with the optical storage disk. However, the interaction system identification number determines the appropriateness of the desired interaction with the storage disk 70.

Figure 8:
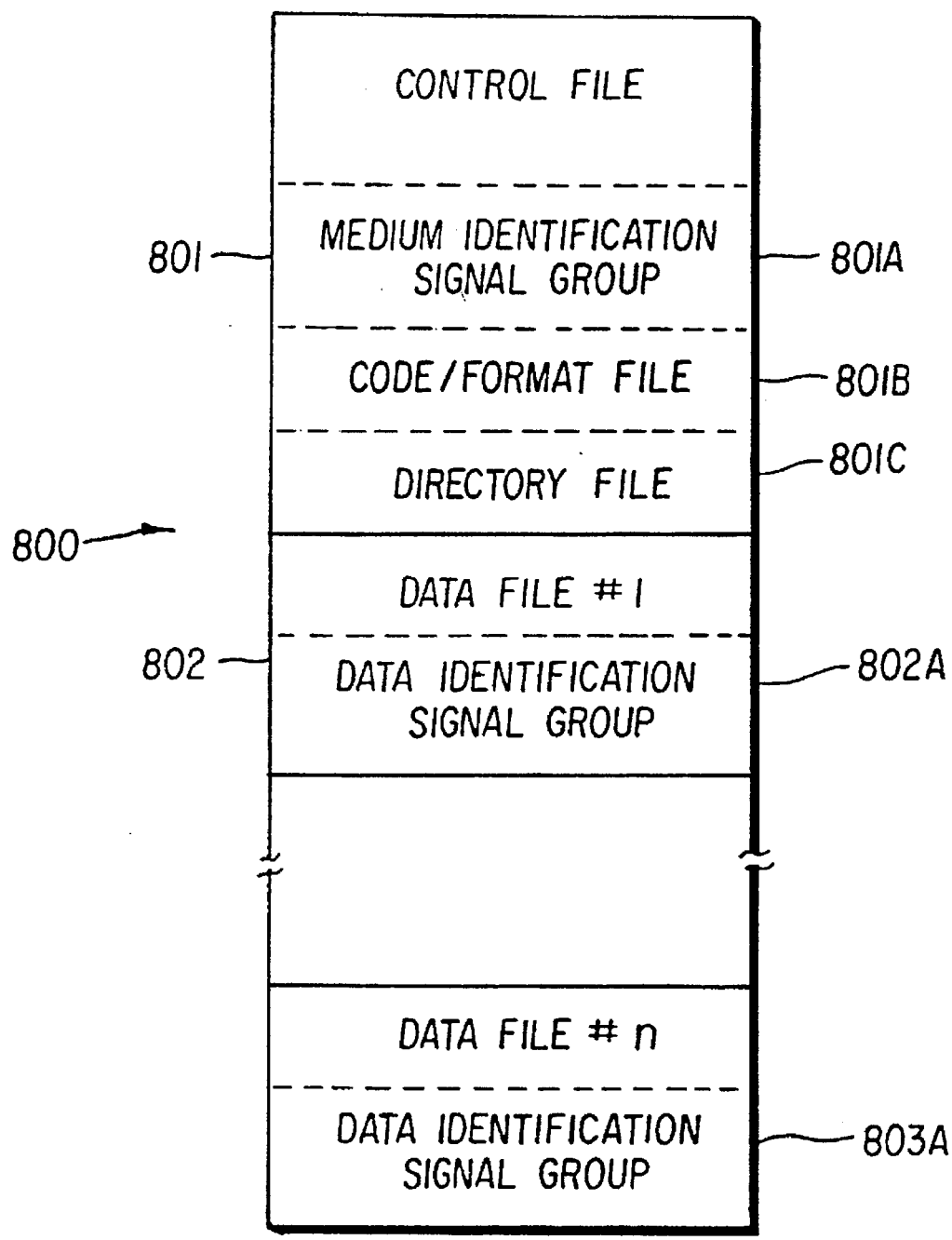
FIG. 8 is a representational view of the file structure stored on the storage medium according to the present invention.

Referring next to FIG. 8, a representation of the organization of the files 800 stored on the optical storage medium in the recording layer 72, according to the present invention, is shown. A control file 801 and a plurality of data files 802–804 are stored on the medium. The control file 801 can include a storage medium identification signal group 801A, a code/format file 801B, and a directory file 801C. The storage medium identification signal group 801A is a character group which is related to the character group (identification markings) 71 embedded in the optical storage disk medium. During initialization of the interaction system in preparation for the interaction with the optical storage medium, the embedded optical characters and the control file 801 are read from the storage medium 70 and entered in the processing and storage unit 77. The embedded characters (identification markings) are compared, by the processing and storage system 77, with the medium identification signal group 801A stored in the control file 801. When these character groups are determined to be consistent, then the information on the storage medium will be deemed to be uncompromised and further interaction between the storage medium interaction system and the storage medium 70 can continue. When the identification characters and the identification signals are determined by the processing and storage unit 77 not to be consistent, then the interaction between the storage medium 70 and interaction system will be halted. This consistency between quantities entered at different times on the storage medium provides an indication that the data on the storage medium has not been compromised. The code/format file 801B provides information to the storage medium interaction system, especially the processing and storage unit 77, as to how the information on the storage medium 70 is formatted and/or encoded. The processing and storage unit 77 is responsive to these data characterizations and translates the data signal groups on the storage medium 70 into data signal groups which can be processed by the processing and storage unit 77. Unless reformatted and decoded, the data signal groups can not be processed by the processing and storage unit 77 and will not be useful to the (operator of the) interaction system. The directory file 801C is a file, typically provided in with the storage of signal groups which relates an identification of a particular data file 802–803 with a specific location on the storage medium, the identification permitting the processing and storage unit to generate control signals which result in the retrieval of a specified data file. In the case of pre-recorded medium, the directory files will be fixed in the storage medium. In the case of writable media, the directories will have the address information written therein when the data files are stored on the storage medium. Similarly, when information is being written on the storage medium, identifying signal groups associated with the data files are compared with the embedded identification marking on the medium or with the medium identification signal group. This comparison can be used to determine if the data signal group(s) being stored is appropriate to the particular storage disk.

Figure 9B:
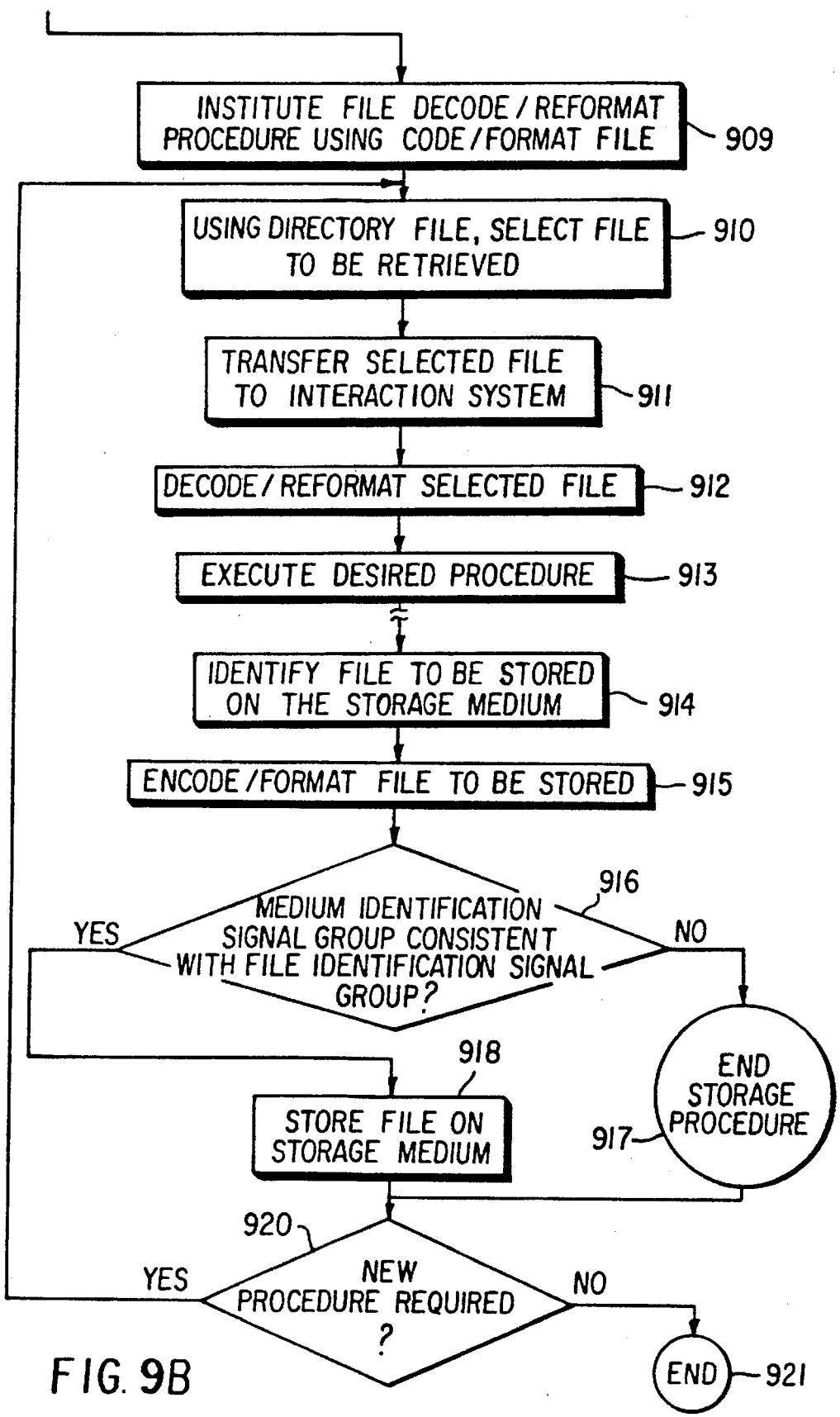

Referring next to FIGS. 9, 9A and 9B, a flow chart of the interaction between the optical storage disk 70 and the interaction system illustrated in FIG. 7 is shown. In step 901, the process is initiated by having the interaction system engage the optical storage disk 70. In the preferred embodiment, the optical storage disk 70 is physically engaged by the interaction system by means of a rotatable spindle. In step 902, the activation of the interaction typically results from operator intervention through a keyboard associated with terminal 78A of the input/output unit 78. Upon activation of the interaction system 75, The spindle and the optical disk will begin rotation. The optical character reader unit 76 identifies the embedded optical characters on the disk and transfers these characters to the processing and storage unit 76 in step 903. Generally simultaneously, the optical read/write head unit 73 retrieves the control file 801 from the optical storage disk 70 in step 904. In step 905, the embedded optical character group 71 is then compared with the medium identifying signal group 801A included in the control file 801 in step 905. When the optical character group 71 is not consistent with medium identifying signal group 801A, the interaction between the interaction system 75 and the optical disk 70 will be terminated in step 906. Otherwise the interaction with the optical disk 70 will continue. Step 907 provides for the situation wherein, in addition to the character group 71 and the medium identifying signal group 801A which are both stored on the optical disk 70, the interaction system itself can be provided with a system identification code 77A, the system identification code typically being stored in the processing and storage unit 77. In step 907, the interaction system compares this interaction system identification number 77A with signal groups (i.e., the optical character group 71 and the medium identification signal group 801A) from the optical disk 70 to determine if an interaction therebetween is permitted. If the interaction system does have an interaction system identification number 77A and this code is not consistent with interaction between the interaction system and the coupled optical storage disk 70, the interaction between the interaction system 75 and the optical storage disk 70 is terminated in step 908. When further interaction between the interaction system and the optical storage disk 70 is permitted, then, in step 909, data signal groups in the control file 801, i.e, the code/format file 801B, are used by the processing and storage unit 77 to permit a translation of retrieved data file(s) to a text/format capable of being manipulated by the processing and storage unit 77. Similarly, the decode/format file 801B of the control file 801 can be used to prepare a data file for storage on the optical disk in a format and, if applicable, encoded in a manner consistent with the data files already stored on the disk. If compromise of the security of the information stored on the optical disk is a concern, then the logic signals stored on the optical disk can be encoded in a manner determined by the decode/format file 801B. Steps 910 through 912 represent the process of the retrieval of information from the optical storage disk 70 after the initialization of the interaction system. Steps 914 and 915 represent the process of storing file on the storage medium. An interaction between the interaction system and the storage medium can include only a data file retrieval or a data file storage. In step 910, the file directory 801C of the data files stored on the optical storage disk 70 is made available to the operator. Typically, the directory file 801C is part of the control file 801 which is transferred to the processing and storage unit 77. Directory file 801C can be transferred to the processing storage unit 77 as part of the control file 801 or can be transferred separately. Then, upon input from the operator, the directory 801C is displayed, by way of specific example, on monitor of terminal 78A. The operator can then select one of the files (802 through 803) for transfer to the interaction system in step 911. The decode/format procedures specified by the control file are used to translate the transferred file into a text and format needed for manipulation in the interaction system in step 912. In step 913, the procedure for which the data file was retrieved is executed. For example, if the data file is received for display, the processed text is displayed on the monitor of terminal 78A. After the text has been processed in the manner for which it was retrieved, or if the text is new, e.g., entered from the communication unit 78B or other data entry device coupled to the input/output unit 78, then, the resulting file can be stored on the optical storage disk 70. In step 914, a file to be stored on the storage medium is identified. In step 915, the file to be stored on the coupled optical storage disk is encoded and/or formatted in a manner indicated by the control file. In step 916, a file identification signal group is compared with the control file medium identification signal group and/or with the embedded characters. The file identification signal group can be the interaction system identification number, or the file identification number can be more specific to the contents of the data file to be stored on the coupled storage disk. When the two quantities being compared are not consistent, then the storage of the data file on the storage disk is terminated in step 917. If, however, the two signal groups are consistent, then the file is stored on the optical storage disk in step 918. In step 920, a determination is made as to whether a new procedure involving the coupled optical disk is desired. When no new interaction is desired, the interaction between the interaction system and the storage disk medium is terminated in step 921. Otherwise, the process is reentered at an appropriate step in the procedure, i.e., step 910 is shown in FIG. 9B.

2. Operation of the Preferred Embodiment

Briefly summarized, according to one aspect of the present invention, the marking of the disk, important in providing data file security for the disk, is performed on the storage layer of an optical storage disk, however, the marking is performed prior to the curing of the lacquer overcoat layer according to one embodiment and prior to the application of the lacquer coating in a second embodiment. In the optical storage disk of the present invention, the overcoat is fabricated from a lacquer material for which ultraviolet light provides the curing reaction and reduces the elasticity of the overcoat. This marking takes the form of an optical character group. The optical character group is used by a system interacting with the optical storage disk (or other optical storage medium) to permit a record of the activity involving the disk and to provide security with respect to the contents of the disk.

The purpose of the invention is to provide improved data file security for the files on optical storage medium which can provide a high density data storage. This data file security is particularly important for the writable optical storage medium and the rewritable optical storage medium, wherein data files can be stored on the medium at various times. The greater requirement for security is the result of the lack of control over the stations which can add the new data files to the disk. The technique for providing the additional security is to provide the storage medium with indelible identification markings, i.e., the embedded optical characters, which permanently identify the storage medium in which the markings are embedded. The material stored on the storage medium is then provided with a control file having medium identification signal group related to the embedded optical characters. The system interacting with the optical storage medium, programmed either through hardware or through software, requires consistency between these character/signal groups before further interaction can take place.

The technique for the application of an indelible identification marks to an optical disk can be briefly summarized as follows. According to one aspect of the present invention, the marking of the disk is performed on the storage layer, however, the marking is performed prior to the curing of, or prior to the application of the lacquer or protective overcoat layer. Where not previously applied, the protective overcoat is then applied. The lacquer material is then exposed to ultraviolet light which provides the curing for the lacquer overcoat layer. By marking storage layer prior to curing of the lacquer overcoat layer, the lacquer overcoat layer, when present remains pliable enough to absorb damage that would otherwise result from the disruption of the polycarbonate layer.

In the optical disk capable of having information written or stored thereon after fabrication of the storage medium, the present invention can be implemented in the following manner. An interaction system would, in the prior art, not have the apparatus to interpret the embedded characters. Without the ability to read and interpret the embedded characters automatically, information can be retrieved from the optical storage medium or stored on the optical storage medium which is not appropriate. Therefore, the interaction system is provided with an optical character recognition unit can be used to identify the identify the embedded characters and transfer the characters to the processing and storage unit. In addition, a medium identification signal group which is part of the stored data on the storage medium is transferred to the processing and storage medium. The processing and storage unit can automatically insure the consistency of the data retrieved from the storage medium or written on the storage medium by comparing the embedded characters and the medium identification signal group. In other words, the simultaneous presence of the (visible) optical character information and a consistent data signal group stored in a predetermined location (typically referred to as a header) on the storage medium insures that the data files stored on the disk has not been compromised. In addition, data files to be stored on the storage medium must be consistent with these storage medium indicia. Therefore, the data files to be stored may have a file identification signal group. For example, the data files to be stored may be photographic images. The file identification signal group associated with the photographic images can be related to the owner of the images. The owner of the photographic images will have a consistent medium identification signal group on the storage medium to insure that the photographic images are stored on the correct storage media. A system identification signal group associated with the interaction system can be used to control interaction with the system with the storage medium through comparison with one of the embedded characters or with the medium identification signal group. In the absence of a consistent comparison, the interaction system will be prevented from interaction with the storage medium. As will be clear to those familiar with security systems, the use of processing apparatus to compare automatically the indicia on the storage medium and in the interaction system provides protection against unauthorized interaction with the storage medium.

The present invention can be provided with a further security feature. The data files stored on the storage medium can be encoded. Thus, in order to process these files, a decoding of the data files must be performed. The 'key' to the decoding can be contained in the code/format file of the control file. In this implementation, any data file to be stored on the optical medium must first be encoded using the 'key' in the storage medium control file. It will be clear that interaction system must be able to interpret the code. This decoding 'key' interpretation capability can be included in the interaction system as a hardware or a software process.

While the storage medium has been described both in general terms and in terms of an optical disk, other medium for the storage of optical information, which have the general layer structure in which optical characters can be embedded therein, can use the present invention advantageously. For example, the optical tape storage medium can advantageously use the present invention. In addition, the storage layer has been described as generally including a reflective layer. The use of the reflection of radiation from a storage disk is generally used to identify the information stored thereon. However, the use of an optical storage disk which relies on the interaction of transmitted radiation with the storage media can use the present invention.

The present invention finds an important application in the field of the writable CD disk. One current application is to allow the owner of the writable CD disk to add files when convenient. The present invention provides a measure of security for ascertaining that the files on the optical storage medium have not been compromised and for restricting the access to the stored material. In addition, only certain preselected groups of files can be added to the disk.

In the preferred embodiment, the optical characters are placed in the optical bar code format. The preferred embodiment also includes a separate bar code reader in the system interacting with the optical storage medium. It will be clear that the embedded characters can have format different from the optical bar code format. It will be also be clear that the read/write head can be used to identify the embedded characters without departing from the invention.

Similarly, while the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention. By way of specific example, the lacquer layer used proximate the storage layer could be implemented with any material having properties suitable for the protection of the storage layer. Byway of a different example, in the erasable optical disk, the storage layer can be selected of a material wherein an impinging radiation beam this appropriate parameters can provide a non-reversible change can take place. The non-reversible change protected from compromise by the protective overcoat layer.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A writable optical storage disk for use with an interaction system capable of interacting with said optical storage disk, said interaction system including reading means for converting optically dependent regions on said optical storage disk into electrical signals, said interaction system including processing means for processing said electrical signals, said optical storage disk comprising:

a storage layer, said storage layer including at least one file stored thereon, said one file having optically dependent regions which said reading means converts into a first electrical signal group; and a support layer supporting and protecting said storage layer, said support layer having optically dependent regions which said reading means converts into a second electrical signal group;

wherein said support layer optically dependent regions have a different format than said storage layer, said first and said second electrical signal group being determined by said processing means of said interaction system to be equivalent when said optical storage disk has not been compromised;

wherein said optically dependent regions of said support layer are in an optical bar code format centered on a radius of said optical disk and said characters in said bar code format have a thickness on an arc of constant disk radius which is proportional to said constant disk radius; and wherein a third electrical signal group associated with said interaction system is transferred to the signal processing means of said interaction system which compares said third electrical signal group with at least one of said first and second electrical signal groups and continues interaction between said interaction system and said writable optical disk only when said comparison is positive.

2. A writable optical storage disk for use with an interaction system capable of interacting with said optical storage disk, said interaction system including reading means for converting optically dependent regions on said optical storage disk into electrical signals, and processing means for processing said electrical signals, said optical storage disk comprising:

a storage layer, said storage layer including at least one medium identification signal group and at least one file identification signal group including optically dependent regions stored thereon, which said reading means converts into medium identification electrical signals and file identification electrical signals; and a support layer supporting and protecting said storage layer, said support layer including embedded characters having optically dependent regions of a different format than said medium identification signal group and said file identification signal group, which said reading means converts into embedded characters electrical signals; and wherein said embedded characters electrical signals and said medium identification electrical signals and wherein said medium identification electrical signals and said file identification electrical signals are determined by said processing means of said interaction system to be equivalent when said optical storage disk has not been compromised.

3. A writable optical storage disk as claimed in claim 2, wherein said embedded characters are in an optical bar code format centered on a radius of said optical disk and said characters in said bar code format have a thickness on an arc of constant disk radius which is proportional to said constant disk radius.

4. A writable optical storage disk as claimed in claim 2, wherein said interaction system has a system identification signal group associated therewith, which are processed by said signal processing means of said interaction system as system identification electrical signals that are compared with at least one of said embedded characters identification electrical signals and said medium identification electrical signals, wherein said signal processing means continues interaction between said interaction system and said writable optical disk only when said comparison is positive.

* * * * *